United States Patent [19]
Roesel

[11] 3,741,555
[45] June 26, 1973

[54] CONTROL APPARATUS AND METHOD FOR METALWORKING TOOLS

[76] Inventor: Vernon H. Roesel, Route No. 1-Box 131M, Cypress, Tex.

[22] Filed: Dec. 22, 1970

[21] Appl. No.: 100,573

[52] U.S. Cl.............. 266/23 M, 228/29, 266/23 N
[51] Int. Cl............................................. B23k 7/04
[58] Field of Search ................... 266/23 M, 23 NN, 266/23 N, 23 L, 23 F, 23 HH; 228/9, 29

[56] References Cited
UNITED STATES PATENTS

| | | | |
|---|---|---|---|
| 3,612,502 | 10/1971 | Vasiliev et al. | 266/23 N X |
| 2,249,413 | 7/1941 | Bechtle et al. | 266/23 M |
| 3,388,901 | 6/1968 | Fergurson | 266/23 N |
| 3,032,328 | 5/1962 | Petersen et al. | 266/23 M |
| 3,217,204 | 11/1965 | Nance | 266/23 M X |
| 3,351,332 | 11/1967 | Nowell et al. | 266/23 L |
| 3,591,156 | 7/1971 | England | 266/23 L |
| 2,687,880 | 8/1954 | Waterson | 266/23 NN |

Primary Examiner—Frank T. Yost
Attorney—Pravel, Wilson & Matthews

[57] ABSTRACT

An apparatus and method provided for controlling the position of a metal working tool, such as a welding head or torch or a cutting head or torch, with respect to the work pieces being joined or separated by the metal working tool.

10 Claims, 5 Drawing Figures

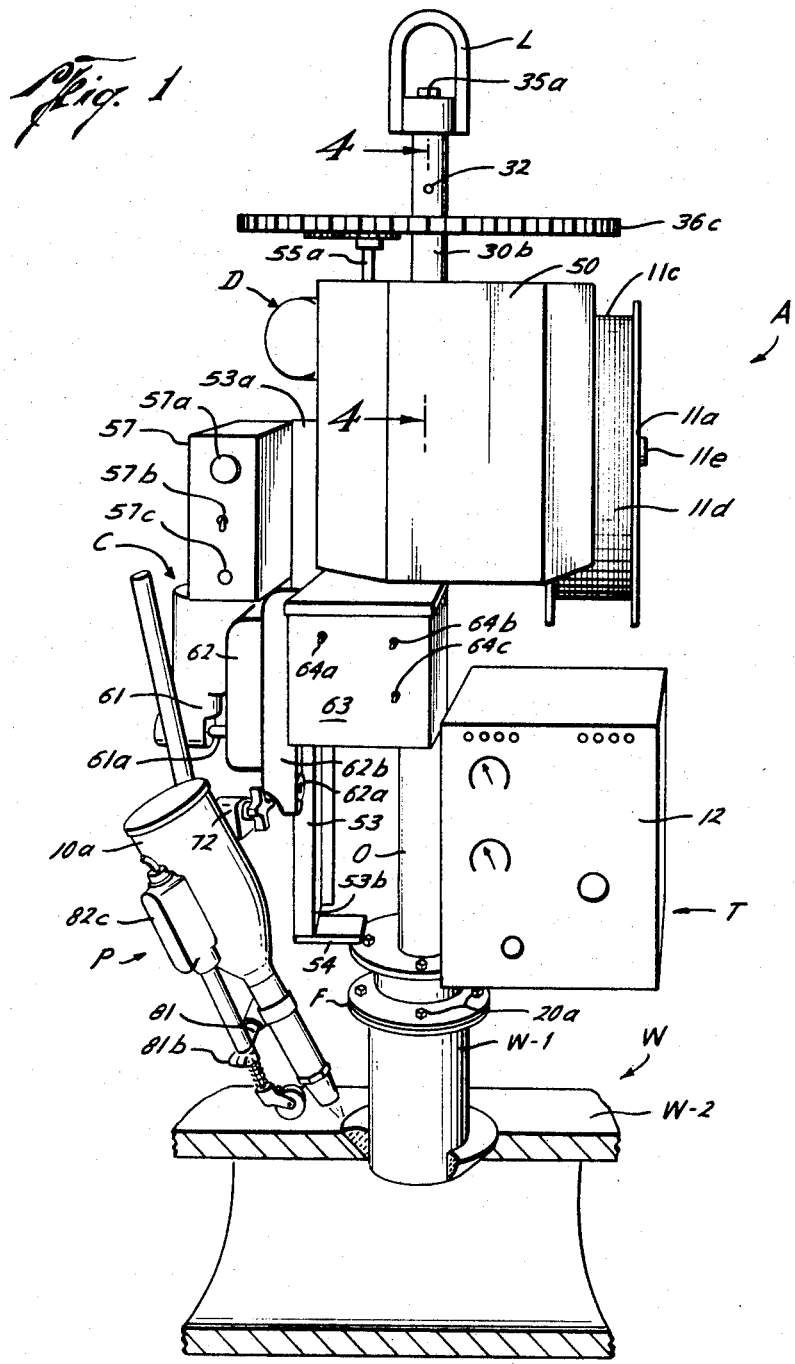

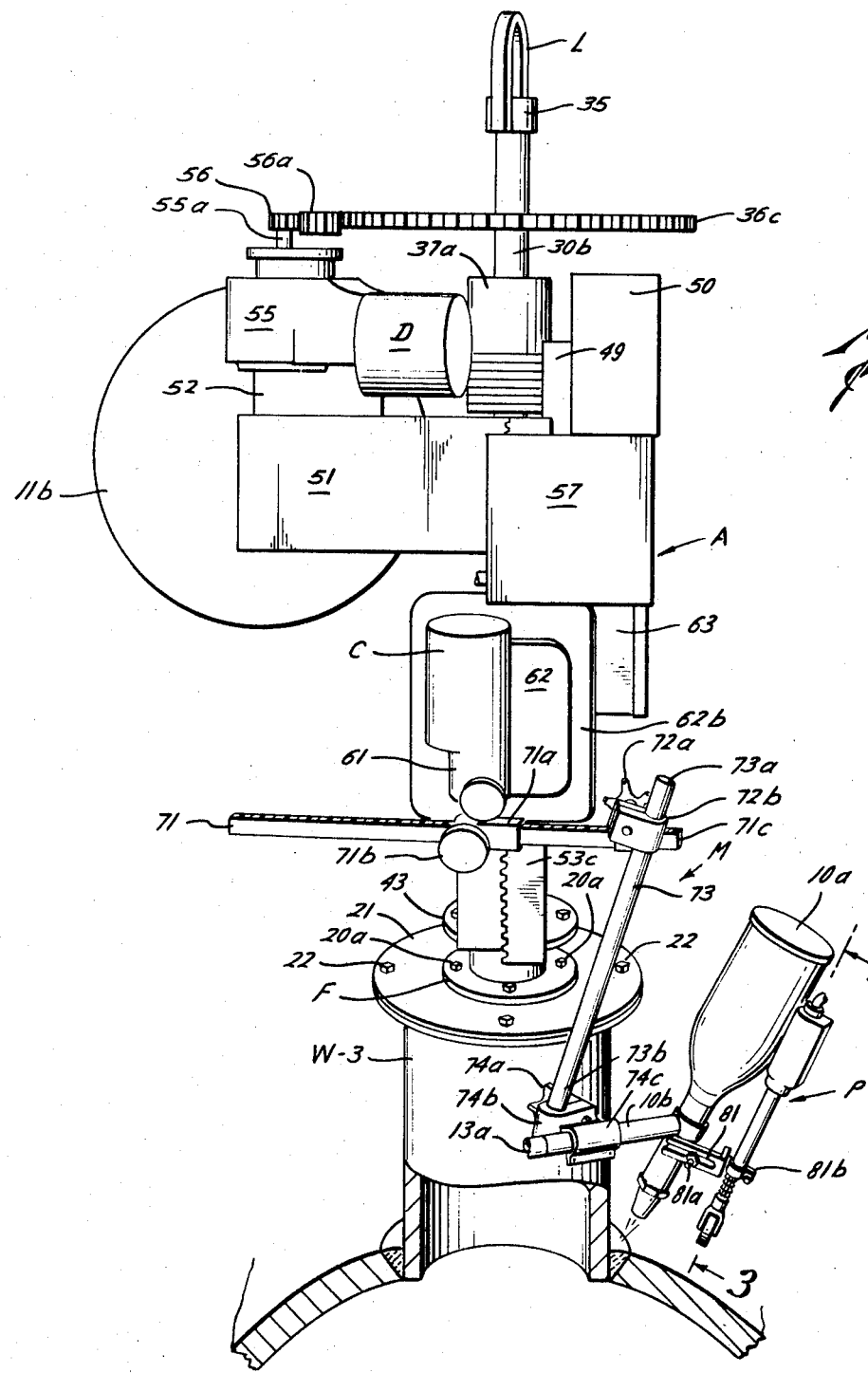

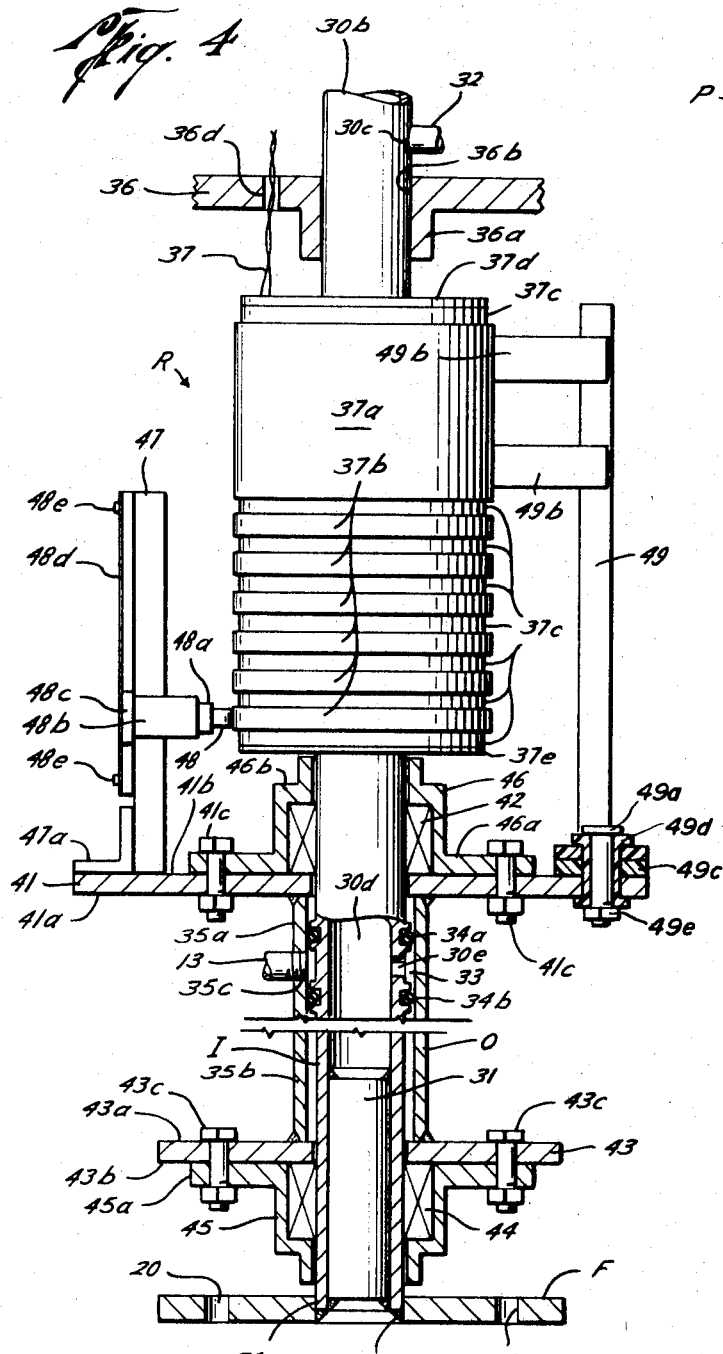
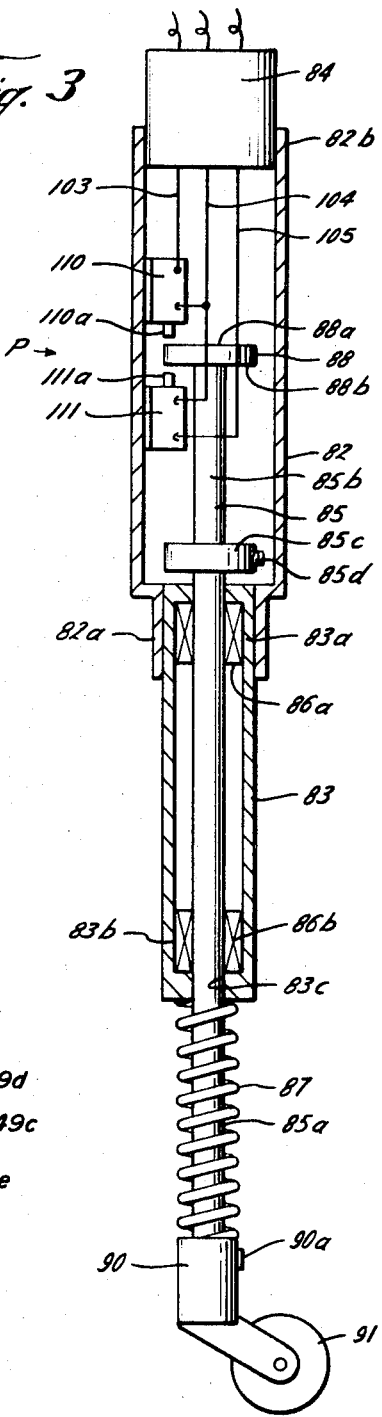
Vernon H. Roesel
INVENTOR
BY
Pravel Wilson & Matthews
ATTORNEYS

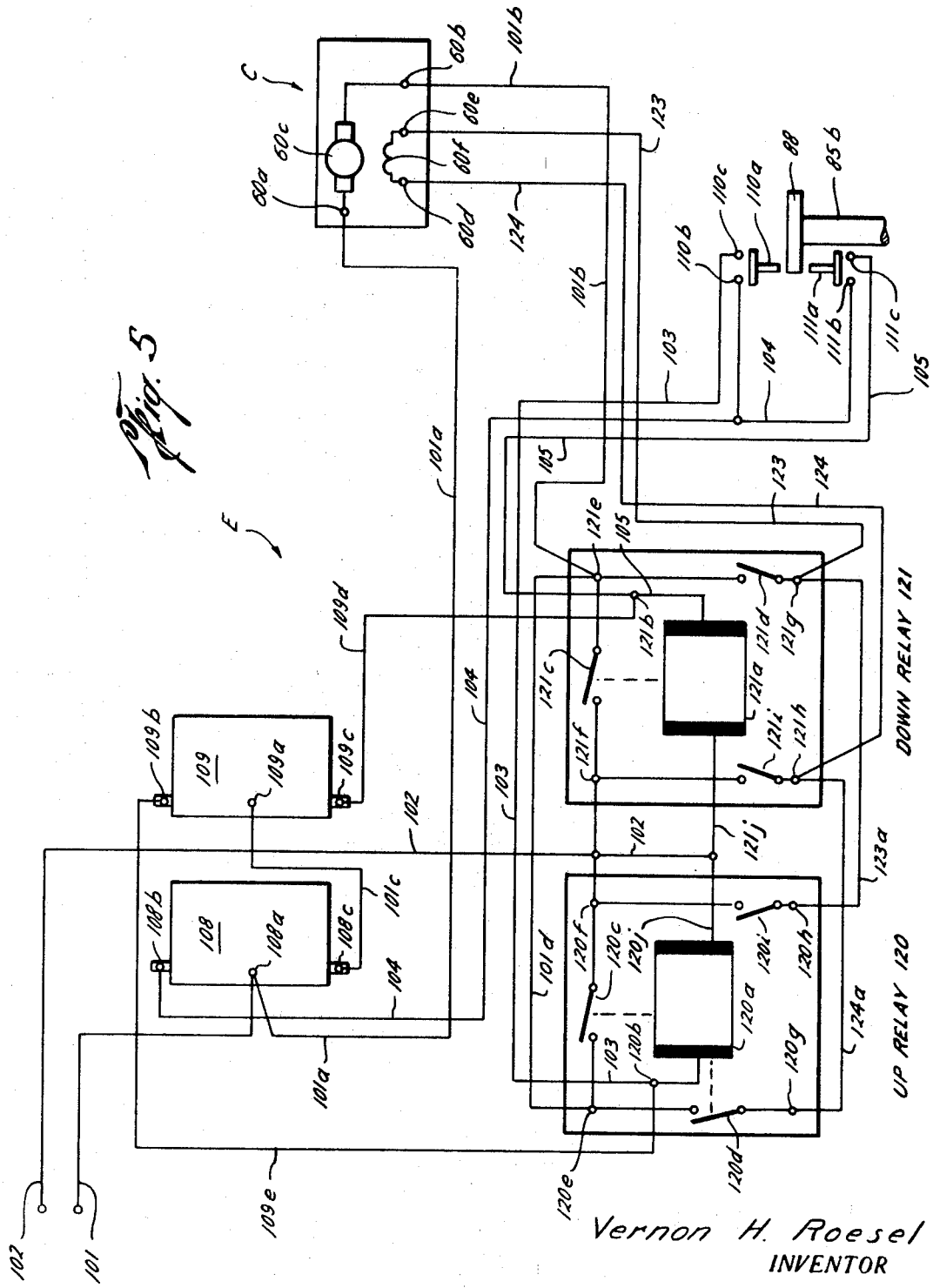

CONTROL APPARATUS AND METHOD FOR METALWORKING TOOLS

BACKGROUND OF THE INVENTION

1. Field of the Invention

The present invention relates to apparatus and methods for controlling the position of metal working tools, such as welding and cutting torches, with respect to workpieces.

2. Description of the Prior Art

In the prior art apparatus for controlling the position of a metal working tool with respect to a curvilinear work path such as a work path defined by the intersection of two cylindrical or tubular workpieces to be welded together, complex and intricate gear and control arrangements and structure, as in U.S. Pat. No. 2,910,289, were used. Such gear arrangements required highly accurate alignment of the apparatus with respect to the work path, and of the gears with respect to other gears, as well as synchronized control of such complex structure to insure that the tool was maintained a uniform distance from the workpieces while following the curvilinear work path.

Alternative prior art control apparatus, such as that of U.S. Pat. No. 3,417,979, did not maintain the tool a uniform distance from the workpieces along the work path unless the workpiece to which the apparatus was mounted was a flat plate. Also, removable templates were used to define the curvilinear work path along which the metal working tool travelled. New and different templates had to be made for each different curvilinear work path defined by workpieces of different types, such as plates and tubes, and for each work path defined by workpieces of different sizes and diameters. Fabrication of such templates with the degree of precision to insure accurate definition of the work path, particularly when working at a remote job site, such as a pipeline installation, was difficult to accomplish.

SUMMARY OF THE INVENTION

Briefly, the present invention provides a new and improved apparatus for controlling the position of a metal working tool with respect to a curvilinear work path along which the metal is worked wherein the control apparatus is mounted with the workpieces to be worked and the metalworking tool is mounted with the apparatus and moved with respect to the curvilinear work path while the spacing of the tool with respect to the workpieces is sensed and controlled to keep the metalworking tool a predetermined distance from the work path and workpieces. The apparatus of the present invention allows continuing rotational movement of the metalworking tool with respect to the workpieces through an electrical commutator or slip ring means and a passageway for gas, both of which are formed in an inner housing fixedly mounted by a mounting means to the workpieces. The slip ring means and the gas passageway furnish electrical energy and gas, respectively, to electrical contacts and a gas conduit in an outer housing which supports the metalworking tool and rotates with respect to the inner housing as the metalworking tool moves along the work path and thereby prevents tangling or wrapping of electrical conductors and gas conduits during such continuing rotational movement.

It is an object of the present invention to provide a new and improved control apparatus and method for metalworking tools.

It is an object of the present invention to provide a new and improved apparatus for controlling the position of a metalworking tool with respect to a curvilinear work path along which the workpieces are worked.

It is an object of the present invention to provide a new and improved portable apparatus for controlling the position of a metalworking tool with respect to a curvilinear work path along which the workpieces are worked.

It is an object of the present invention to provide a new and improved apparatus for controlling the position of a metalworking tool with respect to a curvilinear work path along which the workpieces are worked, permitting continuing rotational movement of the tool with respect to the workpieces.

BRIEF DESCRIPTION OF THE DRAWINGS

FIG. 1 is a front isometric view of the control apparatus of the present invention;

FIG. 2 is a side isometric view of the control apparatus of the present invention;

FIG. 3 is a cross-sectional view taken along the lines 3—3 of FIG. 2;

FIG. 4 is a cross-sectional view taken along the lines 4—4 of FIG. 1; and

FIG. 5 is a schematic electrical circuit diagram of the electrical control circuit of the control apparatus of the present invention.

DESCRIPTION OF THE PREFERRED EMBODIMENT

In the drawings, the letter A designates generally the control apparatus of the present invention which controls the position of a metalworking tool T, which may be a welding tool or a cutting tool or other suitable metalworking tool, with respect to a curvilinear work path which is defined by the intersection of a pair of workpieces, in this embodiment a nozzle W-1 which is being welded by the metalworking tool T into a pipe workpiece W-2 (FIG. 1). A nozzle W-3 (FIG. 2) larger in diameter than the nozzle W-1 is shown in FIG. 2 mounted to the pipe W-2 to illustrate the adjustability to different sizes of workpieces of the apparatus A, as will be set forth hereinbelow. Other suitable workpieces include pressure vessels, either spherical or cylindrical, or flat metal members, or other pipes, and other suitable configurations of metallic workpieces.

The metalworking tool T may be any suitable welding or cutting metalworking tool, in this embodiment a welding tool made by the Lincoln Electric Company, Model LN-6, and includes a welding nozzle or head 10a (FIGS. 1 and 2) which welds the nozzle workpiece W-1 to the pipe workpiece W-2 in this embodiment of the invention.

A coil or reel of welding rod or wire 11d for the welding head 10a is stored in a storage reel 11c mounted between a pair of end plates 11a and 11b on an axle 11e. The welding wire is extracted from the reel 11c and fed to the control box 12 wherein a weld mix is formed under a suitable control arrangement by control structure in a control box 12 of the welding tool T. Welding gas for the welding mix is fed by the apparatus A to a flexible gas conduit 13 which conveys such gas from the control box 12 in a manner to be set forth hereinbelow.

The welding rod 11d and the welding gas are formed into a weld mix in the control box 12 and are conveyed through a flexible conduit 13a (FIG. 2) from the control box 12 to a rigid gas inlet conduit 10b by which the welding head 10a is mounted to the apparatus A. The inlet conduit 10b conveys the welding mix from the flexible conduit 13a to the welding head 10a to be used in the metalworking operation of the tool T.

Other types of metalworking tools, such as cutting torches, and welding tools using submerged arc, flux-cored, or gas shielded welding techniques may be used as the metalworking tool T. The apparatus A is mounted with the workpiece W-1 (FIG. 1) by a mounting flange F (FIGS. 1, 2 and 4). A plurality of apertures 20 are formed in the mounting flange F (FIG. 4) to allow passage therethrough of bolts 20a (FIGS. 1 and 2) or other suitable fastening means to attach the mounting flange F to the workpiece W-1.

When the workpiece W is larger in diameter than the mounting flange F, for example the somewhat larger nozzle workpiece W-3 (FIG. 2), a circular mounting plate 21 of a like diameter to the workpiece 3 (FIG. 2) is mounted with the workpiece 3. A plurality of apertures are formed about the outer rim of the mounting flange 21, and a plurality of bolts 22 or other suitable fastening means are inserted therethrough to attach the mounting plate 21 with the workpiece W-3. A plurality of apertures are formed in the mounting plates 21 interiorly of the apertures for the bolts 22, and such apertures are spaced in a like manner to the spacing of the apertures 20 in the mounting flange F in order that the bolts 20a passing through the mounting flange F also pass through the mounting plate 21 to allow the apparatus A to be used with the larger diameter workpiece W-3.

An inner support I (FIG. 4), a tubular member of steel or other suitable material, and an outer support O (FIG. 4) of like material comprise supporting structure for the apparatus A. The inner support I is welded or otherwise suitably fixedly attached at a lower end 30a in an aperture 20b centrally located with the mounting flange F (FIG. 4).

A cylindrical plug 31 (FIG. 4) is welded or otherwise sealingly engaged within the interior of the lower end 30a of the inner support means I, and seals such lower end for reasons to be set forth hereinbelow. A similar cylindrical sealing plug or plate is welded or otherwise sealingly affixed within the interior of an upper portion 30b of the inner support I.

A gas inlet 30c is formed in the upper end 30b of the inner support I intermediate the sealing plug mounted in such upper end 30b and the plug 31 is mounted in the lower end 30a, and a gas inlet conduit 32 is inserted in the gas inlet 30c in order that the gas required by the metalworking tool T may pass from a suitable storage receptacle through the conduit 32 and the inlet 30c into an interior passageway 30d formed within the interior of inner support I and sealed by the plugs at the ends 30a and 30b of such inner support.

A gas outlet 30e (FIG. 4) is formed in the inner support I at the lower end thereof above the cylindrical plug 31 and permits the welding gas to pass from the interior 30d of such support to an annular passageway 33 located between the inner support I and the outer support O.

The annular passageway 33 (FIG. 4) is sealed by annular sealing means including an upper O-ring or annular seal 34a and a lower O-ring or annular seal 34b which are mounted within suitable grooves formed in the exterior of the inner support I above and below, respectively, the gas outlet 30e in the inner support I. The annular sealing means prevents welding gas from escaping from the annular passageway 33 during rotational movement of the outer support O with respect to the inner support I. An aperture 35c is formed in the outer support O adjacent the annular passageway 33, and the welding gas conduit 13a is mounted therein to receive the welding gas to the control box (FIG. 2). The gas conduit 13a is thus attached to the outer support O and is freely movable with respect to the inner support I and does not tangle or wind about the inner support I during rotational movement of the outer support O, as will be more evident later.

A cap 35 (FIG. 2) is mounted with the upper end 30b of the inner support I, and is secured thereto by a bolt 35a or other suitable securing means. A U-shaped lifting lug L is welded or otherwise suitably firmly attached with the cap 35 (FIGS. 1 and 2) and permits a hook or other suitable structure to be inserted therein to lift the apparatus A and move such apparatus A into position atop the workpieces W when it is desired to perform metalworking operations with the welding tool T. After metalworking operations are completed, the lifting means is re-inserted into the lifting lug L to lift the apparatus A away from the workpieces W.

A circular gear support plate 36 (FIGS. 1, 2 and 4) is welded or otherwise suitably affixed along a cylindrical inner surface 36b (FIG. 4) adjacent a downwardly extending portion 36a thereof to the exterior of the inner support I at a position adjacent the upper end 30b thereof. A plurality of gear teeth 36c (FIGS. 1 and 2) are formed along the periphery of the gear plate 36 and engage a spur gear arrangement to drive the outer support O rotatably with respect to the inner support I, as will be set forth below.

A passageway 36d (FIG. 4) is formed in the plate 36 and allows passage therethrough of a plurality of suitable electrical conductors 37 which convey electrical power to an electric commutator or slip ring arrangement R (FIG. 4). The electrical conductors 37 are electrically connected to, and convey electrical energy to a first conductive slip ring or commutator 37a (FIG. 4), and other similar electrical conductors convey electrical energy to a plurality of conductive slip rings 37b. The slip rings 37a and 37b are made from copper or other suitable conductive material, and are separated with respect to each other by a plurality of insulative or non-conductive or dielectric bushings 37c, which prevent electrical contact between the adjacent slip rings 37a and 37b.

An upper mounting plate 37d and a lower mounting plate 37e maintain the slip rings 37a and 37b and the insulative bushings 37c in a stacked relationship with respect to each other, and bolts or other suitable fastening means are inserted through the upper plate 37d and the lower plate 37e to maintain the slip rings and insulative bushings in such stacked relationship. The bolts are provided with suitable insulation to insulate such bolts from the slip rings 37a and 37b and prevent such bolts from conducting electricity between the slip rings 37a and 37b.

The electrical energy provided by the upper slip ring 37a is furnished to control structure in the control box 12 of the metal working tool T to form the welding mix furnished from such control box 12 to the metal working head 10a. Four of the conductive slip rings 37b provide electrical energy, as will be set forth below, for a welding mix feed motor mounted within the control box 12 of the metal working tool T which controls the rate of feeding of the welding mix from the control box 12 to the welding head 10a. The other conductive slip rings 37b furnish electrical energy for a drive motor D (FIGS. 1 and 2) which drives the outer support O with respect to the inner support I, and a control motor C (FIGS. 1 and 2) which controls the spacing of the welding head 10a with respect to the workpieces W.

The outer housing O is welded or otherwise suitably affixed at an upper end 35a (FIG. 4) thereof to a lower surface 41a of an upper support plate 41. The outer support O is mounted in a like manner at a lower end 35b to an upper surface 43a of a lower support plate 43. The gas outlet 35c is formed in the outer support O intermediate the upper end 35a and the lower end 35b.

The outer support O, the upper mounting plate 41 and the lower mounting plate 43 are freely rotatably movable with respect to the inner support I and permit continuing rotational movement of the metalworking tool T with respect to the workpiece W and the mounting flange F and inner housing I, in order that continuing rotational movement of the metalworking tool T may continue in accordance with the thickness of the weld without tangling or wrapping of the gas and electrical supply conduits and conductors.

An upper flange bearing 42, of the well-known type, is mounted with the inner support I above the support plate 41 by a suitable mounting means, for example a set screw in the inner race thereof engaging the outer surface of the inner support I. The outer race of the flange bearing 42 is freely rotatable with respect to the inner race and the inner support I.

An upper flange housing 46 is mounted along an outwardly extending portion 46a to an upper surface 41b of the upper support plate 41 by a plurality of bolts 41c or other suitable fastening means. The upper flange bearing 42 engages an inwardly extending portion 46b of the flange housing 46 and provides support for the outer support O while permitting free rotational movement of the outer support O with respect to the inner support I.

A lower flange bearing 44 (FIG. 4) is mounted with the inner support I in a like manner to the housing 42 beneath the lower support plate 43 to provide support for the outer support O and permit rotational movement of the outer support O with respect to the inner support I. The lower flange bearing 44 is mounted within an annular bearing housing 45 and confined within such housing adjacent the inner support I beneath the support plate 43. An outwardly extending portion 45a of the housing 45 is mounted with a lower surface 43b of lower support plate 43 by a plurality of bolts 43c or other suitable fastening means passing through the lower support plate 43 and the portion 45a of the housing 45.

The flange bearing 44 engages the lower surface 43b of the lower support plate 43 and assists in supporting the outer support O while permitting free rotational movement of the outer support O with respect to the inner support I.

A first brush mounting member 47 (FIG. 4) is attached with the upper surface 41b of the upper plate 41 by an angle iron 47a or other suitable attaching means. The brush mounting member 47 supports a plurality of copper brushes 48, corresponding in number to the number of lower slip rings 37b mounted with the inner support I. Since each of the copper brushes 48 is of like construction to the others, and mounted with the brush mounting 47 in a like manner, only one of such brushes is shown in the drawings in order to preserve clarity in the drawings.

Each of the brushes 48 is mounted within an insulated brush housing 48a which is mounted within a support housing 48b attached to the brush mounting 47. The brush 48 extends from a surface engaging the slip ring 37b through the insulated housing 48a and mounting 48b to a conductive rear contact 48c where suitable electrical conductors may be attached and convey the electrical energy furnished through the conductors 37 to the slip rings 37b. The electrical energy is conducted from the slip rings 37b by the brush 48 to the contact 48c to the drive motor D, the control motor C, and the welding rod feed motor mounted within the control box 12.

A protective plate 48d is mounted by a plurality of bolts 48e or other suitable fastening means with the brush mounting 47 to protect the electrical connections between the conductors and electrical contacts 48c. The electrical conductors conducting electrical energy from the contacts 48c to the motors set forth above are of the conventional type and have been omitted from the drawings to preserve clarity in the drawings. It should be noted, however, that such conductors are connected between the contacts 48e, the drive motor D, the control motor C, and the control box 12, each of which is mounted with the outer support O. Thus, the electrical conductors do not wrap or tangle with the inner support I during rotational movement of the outer support O.

A second brush support mounting 49 is mounted along a lower portion 49a thereof to the upper end surface 41b of the upper support plate 41. A plurality of electrically conductive brushes 49b are mounted with the upper end of the brush mounting support 49 and engage the conductive slip ring 37a. The brushes 49b are maintained in electrical contact with the slip ring 37a by springs or resilient clamps or other suitable means and conduct the electrical energy from the slip ring 37a to the control box 12 of the metal working tool T. The brush support mounting 49 is electrically conductive, and may be made of brass, and is maintained in electrical contact with the brushes 49b. The brush support mounting 49 is mounted with the upper support plate 41 by a bolt 49e or other suitable fastening means, and an insulating washer 49c and an insulating sleeve 49d are inserted in such mounting to prevent electrical contact between the conductive upper brush support mounting 49 and the upper support plate 41 for safety purposes.

A protective shield 50 (FIGS. 1 and 2) is mounted with the upper support plate 41 to protect the electrical brushes 48 and 49b and the slip rings 37a and 37b from dust and moisture and other undesirable conditions and prevent such undesirable conditions from interferring with the electrical contact between the slip ring 37a and 37b and the brushes 49b and 48 respectively.

The axle 11e (FIG. 1), about which the reel 11c containing welding rod or wire 11d is rotatably mounted, is mounted at an inner end to the upper support plate 41 and rotates along with the support plate 41 and the outer support O with respect to the inner support I and the mounting flange F during the operation of the invention to prevent the welding rod 11d from wrapping about the inner support I during rotational movement of the apparatus A.

A mounting member 51 is also mounted with the upper support plate 41 and extends rearwardly therefrom (FIG. 2) and has mounted therewith an upwardly extending support member 52 to which the drive motor D is mounted. An upper end 53a of a vertically extending support bar 53 is attached to the upper support plate 41.

The vertically extending support bar 53 is mounted at a lower end 53b (FIG. 1) by a flange 54 or other suitable structure to the lower support plate 43. The control box 12 of the weld tool T is also mounted with the lower support plate 43.

The drive motor D (FIGS. 1 and 2) may be any suitable electrical motor, such as for example Bodine Type NSH-12RG made by the Bodine Manufacturing Co. The drive motor D drives a gear arrangement 55 of any suitable type to convert the rotational movement of the drive shaft of the drive motor D in the vertical plane to rotational movement of a drive shaft 55a in a horizontal plane. A spur gear 56 is mounted with the drive shaft 55a and moves when driven by the motor D and gear arrangement 55 in order to drive the apparatus A with respect to the curvilinear work path defined by the workpieces W by engaging the gear teeth 36c mounted with the circular plate 36 at the upper end 30b of the inner support I.

An idler gear 56a is provided and may be engaged between the drive wheel 56 and the gear teeth 36c by an engaging arm or other suitable structure should it be desired to reverse the direction of rotational movement of the apparatus A with respect to the inner support I.

A control box 57, which may be any suitable type of electrical motor control, such as for example the SH-14 Minarik Control made by the Minarik Electric Co. is mounted with the upper end 53a of the vertical support bar 53. The control box 57 has a rotatable knob 57a mounted therewith which adjusts the speed of the drive motor D and consequently the speed of rotation of the apparatus A with respect to the work path. An on-off switch 57b is also mounted with the control box 57 to turn the drive motor D on and off, and an emergency stop button 57c is provided to make emergency stoppage of the drive motor D should it be necessary. Other suitable control boxes of the well-known type may be used in place of the control box 57.

The control motor C (FIGS. 1 and 2) may be an electrical motor of any suitable type, for example the Bug-O Mark II, No. 2050E, made by Weld Tooling, Inc. A gear arrangement 61 is provided to convert the rotational movement of the drive shaft of the control motor C in the horizontal plane to rotational movement of a gear drive shaft 61a (FIG. 1) in a vertical plane. The drive shaft 61a is mounted in a housing 61b along a portion of its length and drives a suitable pinion gear arrangement contained within a gear housing 62 and the pinion gears in such pinion gear arrangement engage a rack gear 53c (FIG. 2) mounted with the support bar 53. When driven by the control motor C, the pinion gears in the gear housing 62 and the rack gear 53c move the control motor C and associated equipment mounted therewith upwardly or downwardly, as will be more evident hereinbelow. Casters or rollers 62a (FIG. 1) are provided within a caster housing 62b of the pinion gear housing 62 and engage the vertical support bar 53 and stabilize the upward and downward movement of the control motor C and gear housing 62 with respect to the support bar 53.

An electrical control box 63 is mounted with the caster housing 62b (FIG. 1) and contains therein an electrical control circuit E (FIG. 5) which controls the operation of the control motor C to energize such motor and move the welding head 10a with respect to the work path, as will be set forth hereinbelow.

A switch lever 64a (FIG. 1), which when operated controls the circuit E and permits the operator of the apparatus A to energize the control motor C and adjust the spacing of the welding head 10a with respect to the workpiece W, is mounted on the face of the control box 63. A three position control lever 64b is mounted with the control box 63 on the face thereof and controls the circuit E and permits the operator of the apparatus to selectively adjust the position of the welding head 10a upwardly or downwardly by energizing the control motor C, as will be set forth hereinbelow. A two position on-off switch 64c is also mounted on the face of the control box 63 and permits the operator of the apparatus A to turn the metalworking tool T on and off by closing an electrical circuit between the slip ring arrangement R and the control box 12.

A mounting apparatus M (FIG. 2) is provided for mounting the welding head 10a with the control motor C in order that the welding head 10a may be selectively spaced from the workpieces W in accordance with the size and type of the particular workpieces W being worked by the working tool T.

A mounting arm 71 is inserted through a mounting sleeve 71a which is attached to the pinion gear housing 62 adjacent the caster housing 62b (FIG. 2). A control knob 71b is provided with a sleeve 71a to selectively clamp and release the mounting arm 71. When the sleeve 71a has released the mounting arm 71, the mounting arm 71 may be moved within the sleeve 71 in order that the extension of such mounting arm with respect to the sleeve 71 may be varied. An attaching member 72 (FIGS. 1 and 2) is mounted with the mounting arm 71 at an outer end 71c thereof and is selectively engaged with the mounting arm 71 under forces exerted an engaging knob 72a (FIG. 2). A pair of clamps 72b are mounted with the engaging knob 72a and have an upper end 73a of a mounting rod 73 mounted therebetween and hold such mounting rod firmly when the engaging knob 72a has been tightened. A plurality of clamps 74b of like construction to the clamps 72b, which are controlled by a similar engaging knob 74a of like construction to the engaging knob 72a, are mounted at a lower end 73b of the mounting rod 73. When the clamps 72b and 74b have been loosened from the mounting rod 73, the spacing between the clamps may be adjusted in order to adjust the vertical spacing of the welding head 10a with respect to the workpieces in accordance with the relative size of the workpieces. Similarly, the outward extension of the extending arm 71 may be selectively varied by releasing the engaging knob 71b and moving the engaging arm 71 having the welding head 10a mounted at the outer end 71c thereof outwardly to accommodate varying diameters and sizes of workpieces. A sleeve 74c is mounted on the clamp 74b opposite the engaging knob 74a and receives therein the rigid conduit 10b conveying the welding mix from the welding head 10a from the welding control box 12. The engagement of the sleeve 74c with the conduit 10b may be rotatably adjusted in order that the angular displacement or bevel of the welding head 10a with respect to the workpieces may be selectively varied in accordance with the bevel desired for each particular workpiece.

A sensor probe P (FIGS. 1-3) is mounted with the welding head 10a adjacent the welding head and travels with the welding head 10a as such welding head is driven along the curvilinear work path by the drive motor D. The sensor probe P senses the spacing of the welding head 10a with respect to the curvilinear work path and sends an electrical signal, in a manner to be set forth hereinbelow, to the electrical control circuit E to energize the control motor C and adjust the spacing of the welding head 10a with respect to the curvilinear work path along the workpieces W and control such spacing in order that the welding head 10a may achieve a uniform weld by being maintained a uniform spacing from the workpieces as the welding head 10a travels along such work path.

The sensing probe P is mounted with the welding head 10a by a two-piece mounting bracket 81 (FIG. 2) and a bolt 81a or other suitable fastening means secures the two pieces of the mounting bracket 81 to each other. The relative spacing of the sensing probe P with respect to the welding head 10a may be varied by releasing the bolt 81a and moving the pieces of the mounting bracket 81 to adjust the spacing between the welding head 10a and the probe P. A mounting sleeve 81b is mounted with the end of the bracket 81 and is rotatably secured with respect to the bracket 81 in order that the angular placement of the sensing probe P with respect to the welding head 10a may be varied in accordance with the particular workpiece being worked by the metalworking tool T.

The sensing probe P (FIG. 3) includes an upper housing 82 and a lower housing 83. The lower housing 83 is mounted at an upper end 83a with a lower end 82a of the upper housing 82. An insulating block 84 is mounted at the upper end 82b of the upper housing 82. Suitable passageways are formed in the insulating block 84 for passage therethrough of a plurality of electrical conductors, as will be set forth hereinbelow.

A sensing probe finger 85 is mounted within the upper housing 82 and lower housing 83 of the sensor probe P, and a plurality of bearings 86a and 86b are provided within the lower housing 83 to insure rotational movement of the probe finger 85 with respect to the housings 82 and 83. The probe finger 85 extends through an aperture 83c formed in the lower end 83b of the lower housing 83. A coiled spring 87 or other suitable resilient means is mounted with a lower end 85a of the probe finger 85 and urges the lower end 85a downwardly from the lower housing 83 into engagement with the workpiece W. When the workpiece W is rough and irregular, it may be desirable to mount a roller or wheel 91 with the lower end 85a of the sensor probe P to reduce wear on the lower end of the probe finger 85. A wheel mounting 90 which is attached to the lower end 85a of the probe finger 85 by a set screw 90a or other suitable means has the wheel 91 mounted therewith for this purpose. If the workpiece is relatively smooth, the wheel 91 and wheel mounting 90 are removed and the lower end 85a of the probe finger 85 engages the workpiece.

An annular collar 85c is mounted with an upper end 85b of the probe finger 85 within the upper housing 82 and is held in engagement with the upper end 85b with a set screw 85d or other suitable means. The spacing of the collar 85c with respect to the upper end 85b may be varied in order to adjust the amount of extension of the lower end 85a from the aperture 83c and the sensor probe P in accordance with the desired spacing of the welding head 10a from the workpiece being worked. A door 82c (FIG. 1) which is hingedly mounted with the remainder of the upper housing 82 is provided and swings open to allow access to the interior of the upper housing 82 for this purpose.

An annular collar 88 is mounted with the upper end 85b of the probe finger 85 and engages the contact buttons 110a and 111a of a pair of electrical contact switches 110 and 111. When the annular collar 88 engages the contact switch 110a along an upper surface 88a, an electrical connection is formed between a first conductor 103 and a second conductor 104, allowing the flow of electricity therebetween. When the collar 88 engages the contact 111a of the switch 111 along a lower surface 88b, an electrical connection is formed between the second conductor 104 and a third conductor 105, allowing the flow of electricity therebetween.

The conductors 103, 104, 105 pass through the passageways formed in the insulating collar 84 at the upper end 82b of the housing 82 and are electrically connected to the electrical control circuit E in the electrical control box 63 (FIG. 1) and furnish electrical control signals to selectively control the control motor C and adjust the spacing of the welding head 10a with respect to the workpiece W, as will be set forth hereinbelow.

The electrical control circuit E (FIG. 5) receives electrical energy through a pair of electrical supply conductors 101 and 102, one of which is electrically connected to the electrical contacts 48c (FIG. 4) which receive energy through the brush 48 from the slip ring 37b. The other of the electrical conductors 101 and 102 is electrically connected to an electrical ground.

The electrical conductor 101 is electrically connected to an "off" terminal 108a of a three position switch 108 which allows selection of manual control or probe control of the spacing of the welding head 10a. The switch 108 is controlled by the control lever 64a on the face of the control box 63. When the lever 64a is moved upwardly (FIG. 1), an electrical connection is formed between the "OFF" terminal 108a and a "PROBE" terminal 108b (FIG. 5) of the switch 108. When the switch lever 64a is moved downwardly (FIG. 1), an electrical connection is formed between the "OFF" terminal 108a and a "MANUAL" terminal 108c of the switch 108. When the switch lever 64a is in its central position, no electrical connection is formed between the terminal 108a and the terminals 108b or 108c, and the control motor C does not receive electrical power.

An electrical conductor 101a connects the terminal 108a to an input terminal 60a of an armature 60c of the control motor C. An electrical conductor 101b electrically connects the output terminal 60b of the armature 60c of the control motor C to an electrical contact 121e of a "DOWN" control relay 121.

The electrical conductor 104 electrically connects the "CAPS" terminal 108b of the control switch 108 to a contact 110b of the switch 110 (FIGS. 4 and 5) and a contact 111b of the switch 111. The conductor 103 electrically connects a contact 110c (FIG. 5) of the switch 110 to a coil 120a of an "UP" relay 120. The conductor 105 electrically connects the contact 111c to a coil 121a of the "DOWN" relay 121.

As has been set forth hereinabove, when the probe finger 85 is moved upwardly by contact with the workpieces W, the collar 88 88 engages the switch button 110a and forms an electrical connection between the contacts 110b and 100c, and when the probe finger 85 is moved downwardly with respect to the workpieces by the resilient spring 87, the collar 88 engages the contact 111a and makes an electrical connection between the contacts 111b and 111c.

An electrical conductor 101c electrically connects the "CAPS" terminal 108c of the control switch 108 to an "OFF" terminal 109a of a manual control switch 109. The manual control switch 109 is operated under the control of the control lever 64b on the face of the control box 63 and allows the operator of the apparatus A of the present invention to control the spacing of the welding head 10a with respect to the workpieces W independently of the sensing probe P should it become necessary or desirable to do so. When the control lever 64b has been moved upwardly (FIG. 1) an electrical connection is formed between the terminal 109a and a "UP" terminal 109b. When the switch 64b has been moved downwardly, an electrical connection is formed between the terminal 109a and the "DOWN" terminal 109c.

An electrical conductor 109e electrically connects the "UP" terminal 109b to the electrical conductor 103 at an electrical contact 120b, providing an electrical connection between the "UP" terminal 109b and the coil 120a of the "UP" relay 120.

An electrical conductor 109d electrically connects the "DOWN" terminal 109c of the control switch 109 to the conductor 105 at an electrical contact 121b, providing an electrical connection between the "DOWN" terminal 109c and the coil 121a of the "DOWN" relay 121.

The "DOWN" relay 121 has associated therewith an armature control contact 121c, a field contact 121d and a return contact 121i each of which contacts is a normally open position when the coil 121a is not receiving energy. When the coil 121a is energized by flow of current through the conductor 103 and a return conductor 121j electrically connected to the conductor 102 in a manner to be set forth hereinbelow, the armature control contact 121c closes and provides a completed electrical circuit for the armature 60c of the control motor C by providing an electrical connection between a terminal 121e, which is electrically connected to the conductor 101b, and a terminal 121f, which is electrically connected to the electrical conductor 102.

The field control contact 121d closes when the coil 121a is energized and provides electrical energy for a field coil 60f of the control motor C by providing an electrical connection between the terminal 121e and a terminal 121g. Electrical current flows from such electrical connection through an electrical conductor 123 to an input terminal 60e of the field coil 60f. A second terminal 60d of the field coil 60f of the control motor C is electrically connected to the electrical conductor 102 through an electrical conductor 124 a terminal 121h of the down relay 121, the closed contact 121i, and the terminal 121f, electrically connected to the conductor 102.

When the coil 121a of the "DOWN" relay 121 is energized, the field coil 60f of the control motor C receives electrical energy when the contact 121d closes over the circuit path from the electrical conductor 101b, the terminal 121e, the closed contact 121d, the terminal 121g, the conductor 123, with a return path for such electrical energy being provided through the conductor 124, the terminal 121h, the closed contact 121i, the terminal 121f and the electrical conductor 102.

An armature control contact 120c, a field control contact 120d, and a ground or return contact 120i of the "UP" relay 120 are in a normally open position when the coil 120a of the "UP" relay 120 is not energized. When the coil 120a is energized by flow of current through the conductor 103 and a return conductor 120j electrically connected to the conductor 102, in a manner to be more evident hereinbelow, the armature control contact 120c closes and provides an electrical connection between the terminal 120e and a terminal 120f. The terminal 120e is electrically connected to the terminal 121e of the down relay 121 by an electrical conductor 101d and is thus electrically connected with the conductor 101b. The terminal 120f is electrically connected to the electrical conductor 102. When the contact 120c closes upon energization of the coil 120a, an electrical path is formed for the armature 60c, of the control motor C through the conductor 101a, the armature 60c the conductor 101b, the terminal 121 e, the conductor 101d, the terminal 120e, the closed contact 120c, the terminal 120f, and the electrical conductor 102.

The field control contact 120d closes when the coil 120a is energized and provides an electrical connection between the terminal 120e and a terminal 120g. The terminal 120g is electrically connected by a conductor 124a to the terminal 121h of the down relay 121 and through the electrical conductor 124 to the terminal 60d of the field coil 60f of the control motor C.

When the coil 120a is energized, the ground contact 120i of the "UP" relay 120 is closed and forms an electrical connection between the terminal 120f and a terminal 120h. The terminal 120h is electrically connected by a conductor 123a to the terminal 121g of the down relay 121 and by the conductor 123 to the terminal 60e of the field coil 60f of the control motor C.

When the coil 120a of the UP relay is energized in a manner to be set forth hereinbelow, the field 60f of the control motor C is energized over a circuit from the conductor 101b, conductor 101d, the terminal 120e, the closed contact 120d, the terminal 120g, the conductor 124a, the conductor 124, through the coil 60f, the conductor 123, the conductor 123a, the terminal 120h the closed contact 120i, the terminal 120f, to the conductor 102.

It should be noted at this point that the current flow to the field coil 60f by the UP relay 120 is reversed from the current flow to the field coil 60f by the DOWN relay 121, causing the direction of movement of the armature 60c of the control motor C to be in opposite directions, depending upon whether the "UP" relay 120 or the "DOWN" relay 121 is energized, in a manner to be set forth hereinbelow.

The operation of the present invention will be set forth with the apparatus A controlling a welding tool T, although it should be understood that other suitable metalworking tools T may be used with the apparatus A and controlled with respect to the spacing of the metalworking tool from the workpath and the workpieces W, as has been previously set forth hereinabove.

The workpiece W-1, which may be for example a nozzle, is initially tack welded with the workpiece W-2 which may be for example a pressure vessel or other pipe or cylindrical member. When the workpieces W-1 and W-2 are tack welded, a workpiece W having a curvilinear work path is formed having a three dimensional curvilinear work path to be traversed by the welding head 10a.

The apparatus A is then lowered into place by means of a suitable moving means attached to its lifting lug L and the apparatus A is then bolted or otherwise suitably secured at its mounting flange F to the workpiece W-1. The radial spacing of the welding head 10a with respect to the workpieces is adjusted by moving the extending arm 71 outwardly with respect to the sleeve 71a until the desired radial position of the welding head 10a has been obtained, and the fastening clamp 71b is thereupon tightened to securely grasp the extending arm 71 in the mounting sleeve 71a. The vertical spacing of the welding head 10a with respect to the workpieces is adjusted by varying the separation of the clamps 72b and 74b along the vertical spacing rod 73 until the welding head 10a is the desired spacing from the curvilinear work path defined by the workpieces W-1 and W-2. The adjusting knobs 72a and 74a are tightened until the clamps 72b and 74b, respectively, grasp the vertical spacing rod 73 firmly to prevent undesirable movement of the welding head 10a. The angle of the welding head 10a with respect to the curvilinear work path to achieve the desired bevel may beaadjusted by radial or circumferential rotational movement of the fixed conduit 10b with respect to the sleeve 74c.

When the welding head 10a is the desired spacing from the work path and at the desired angle with respect to the work path, the position of the sensor probe P with respect to the welding head 10a is adjusted until the wheel 90 at the lower end 85a of the probe finger 85 engages the workpiece W-2, and the fastening bolt 81a is thereupon tightened to securely mount the sensor probe P with respect to the welding head 10a.

The operator of the machine then adjusts the controls on the control box 12 of the metalworking tool T to achieve the desired weld, and adjusts the speed control knob 57a of the speed control 57 of the drive motor D to achieve the desired speed of rotation of the outer support O with respect to the inner support I for the weld to be performed. The operator then moves the control switch 64a upwardly when the apparatus A is to be controlled by the sensor probe P as the metalworking tool T travels with respect to the curvilinear workpath. The operator then energizes the weld motor by the switch 64c and the drive motor D by the switch 57b.

The motor D drives the outer support O and the portions of the apparatus A mounted therewith in rotational movement with respect to the inner support I, as has been previously set forth hereinabove, with the electrical contact structure between the inner support I and the outer support O, and the gas conduit formed within the inner support I extending to the annular passageway 33 and the outer support O providing electrical energy and welding gas, respectively, during continuing rotational movement of the outer support O with respect to the inner support I and thereby allowing continuing rotational movement of the welding apparatus A with respect to the workpieces W without tangling or wrapping of the electrical and gas supply conductors and conduits. The rotational movement may thus continue in accordance with the thickness of the weld desired to be formed and the thickness of the workpieces being worked by the metalworking tool T. As the metalworking tool T moves with respect to the curvilinear work path, the sensor probe P is driven alternately upwardly and downwardly with respect to the curvilinear work path defined by the intersection cylindrical workpieces W.

As the probe finger 85 is driven upwardly by engagement with an increase in the elevation of the work path, the collar 88 engages the contact 110a and forms an electrical connection within the switch 110, energizing the coil 120a of the relay 120 through the conductors 103 and 121j and closing the contacts 120c, 120d and 120i of the "UP" relay 120 and energizing the control motor C, as has been previously set forth hereinabove. The control motor C drives the gear arrangement in the housing 61 to energize the pinion gears in the housing 62 which move with respect to the rack gear 53c and move the welding head 10a upwardly with respect to the workpieces W. The upward movement of the welding head 10a with respect to the workpiece continues until the spring 87 maintaining the probe finger 85 in contact with the workpieces W moves the collar 88 out of engagement with the contact 110a and interrupts the flow of electricity energizing the coil 120a of the relay 120, stopping the energy flow to the control motor C, at which time the welding tool 10a reaches the proper spacing with respect to the work path W.

As the welding tool 10a reaches a portion of the curvilinear work path wherein the work path moves downwardly away from the welding head 10a, the probe finger 85 is resiliently held in engagement with the downwardly moving work path, and the collar 88 moves downwardly and engages the contact 111a of the switch 111 energizing the coil 121a of the "DOWN" relay 121 through the conductors 105 and 121g and thereupon closing the contacts 121c, 121d and 121i of such relay, as has been set forth hereinabove. When the contacts 121c, 121d and 121i are closed, the control motor C is energized to move in an opposite direction of movement to the direction when energized by the relay 120, and accordingly the control motor C moves the pinion gears within the housing 62 with respect to the rack gear 53c in a direction to move the welding head 10a downwardly with respect to the work path W. Such downward movement continues until the collar 88 of the probe finger 85 moves out of engagement with the contact 111a of the switch 111 by downward movement of the welding head 10a and probe finger housing 82 with respect to the probe finger 85.

In this manner, the welding head 10a moves with respect to the curvilinear work path with the sensor probe P energizing the electrical control circuit E and the circuit E controlling the motor C and adjusting the spacing of the welding head 10a with respect to the work path as the welding tool 10a traverses such work path and permitting continuing rotational movement of the welding head with respect to the work path until the desired weld is achieved.

Should the operator desire to manually control the spacing of the welding head 10a with respect to the work path during the operation of the metalworking tool T, he moves the control lever 64a downwardly, forming an electrical connection between the contact 108a and 108c, and conducting electrical energy from the conductor 101 through the conductor 101c to the contact 109a of the manual control switch 109.

When the switch 64a is moved downwardly and forms an electrical connection between the contacts 108a and 108c, no electrical connection is formed through the contact 108b disabling the conductor 104, and preventing the sensor probe 85b and collar 88 mounted therewith from inadvertently energizing the coils 120a and 121a of the up relay 120 and down relay 121, respectively, and thus permits control of the operation of the apparatus A to remain with the operator, without interruption from the sensor probe P.

When upward movement of the welding head 10a is desired in the manual operation of the invention, the operator moves the control lever 64b upwardly, forming an electrical connection between the contacts 109a and 109b of the switch 109, energizing the coil 120a of the "UP" relay 120. The "UP" relay 120 thereupon operates in the manner previously set forth to adjust the spacing of the welding head 10a upwardly with respect to the workpieces W by the control motor C.

When downward movement of the welding head 10a with respect to the workpieces W is desired, the operator moves the control switch 64b downwardly, forming an electrical connection between the contacts 109a and 109c, permitting electrical energy to flow from the conductor 101c through the conductor 109d, energizing the coil 121a of the "DOWN" relay 121. When the "DOWN" relay 121 is energized, it operates in the manner previously set forth hereinabove to permit the flow of electrical energy to the control motor C and thereupon adjust the spacing of the welding head 10a downwardly with respect to the workpath W.

The foregoing disclosure and description of the invention are illustrative and explanatory thereof, and various changes in the size, shape, materials, wiring connections and contacts as well as in the details of the illustrated circuitry and construction may be made without departing from the spirit of the invention.

I claim:

1. An apparatus for controlling the position of a metalworking tool with respect to a curvilinear work path along which the workpieces are worked, permitting continuing rotational movement of the tool with respect to the workpieces comprising:
  a. means for mounting the apparatus with the work;
  b. inner support means for supporting the apparatus, said inner support means being fixedly mounted with said mounting means, said inner support means comprising:
    1. electrical commutator means for furnishing electrical energy to the working tool during rotational movement of the working tool;
    2. gas inlet means for receiving gas to be provided to the working tool;
    3. gas outlet means for dispensing the gas from said inner housing means; and
    4. annular sealing means adjacent said gas outlet means for preventing leakage of the gas; and
  c. outer support means rotatably movable with respect to said inner support, said outer support means supporting the working tool, said outer support means comprising:
    1. electrical contact means for engaging said electrical commutator means and receiving electrical energy for the working tool from said electrical commutator means; and
    2. gas conduit means for conveying gas to the working tool from said gas outlet means during rotational movement of the working tool, wherein the working tool receives electrical energy and gas during continuing rotational movement of the working tool with respect to the work.

2. The structure of claim 1, further including:
  a. means for sensing the spacing of the working tool with respect to the work as the working tool moves along the curvilinear work path; and
  b. electrical control means responsive to said sensing means for controlling the spacing of the working tool with respect to the work wherein the working tool remains a predetermined distance from the work as such working tool moves along the curvilinear work path.

3. The structure of claim 2, wherein said sensing means comprises:
  a. sensor probe means for engaging the work adjacent the curvilinear work path; and
  b. resilient means for holding said sensor probe means in engagement with the work.

4. The structure of claim 2, wherein said control means comprises:
  a. control motor means for adjusting the spacing of the working tool with respect to the work; and
  b. electrical circuit means to energize said control motor means in response to said sensing means.

5. The structure of claim 1, wherein said outer housing means comprises:
  a. mounting arm means extending outwardly with respect to said outer housing means, said mounting arm means having the working tool mounted therewith; and
  b. means for adjusting the outward extension of said mounting arm means wherein the position of the working tool with respect to the work may be adjusted in accordance with the size of the work.

6. The structure of claim 1 further including:
lifting lug means mounted with said inner support means, said lifting lug means permitting the apparatus to be lifted from the work and transported to a new workpiece when the metalworking has been performed.

7. The structure of claim 1, wherein said means for mounting the working tool to the apparatus comprises:
means for adjusting the spacing of the working tool to a preselected spacing from the curvilinear work path in accordance with the metalworking operation being performed.

8. The structure of claim 1, wherein said means for mounting the working tool to the apparatus comprises:
means for adjusting the angular placement of the working tool to a preselected angle in accordance with the desired bevel to be achieved by the tool.

9. The structure of claim 1, wherein said sensing means comprises:
sensor probe means for engaging the work adjacent the curvilinear work path.

10. An apparatus for controlling the position of a metalworking tool with respect to a curvilinear work path along which the workpieces are worked, permitting continuing rotational movement of the tool with respect to the workpieces comprising:
  a. means for mounting the apparatus with the work;
  b. inner support means for supporting the apparatus, said inner support means being fixedly mounted with said mounting means, said inner support means comprising:
    1. gas inlet means for receiving gas to be provided to the working tool;
    2. gas outlet means for dispensing the gas from said inner housing means; and
    3. sealing means adjacent said gas outlet means for preventing leakage of the gas;
  c. outer support means rotatably movable with respect to said inner support, said outer support means supporting the working tool, said outer support means comprising gas conduit means for conveying gas to the working tool from said gas outlet means during rotational movement of the working tool, wherein the working tool receives electrical energy and gas during continuing rotational movement of the working tool with respect to the work.

* * * * *